United States Patent
Baik et al.

(10) Patent No.: US 9,645,361 B2
(45) Date of Patent: May 9, 2017

(54) LENS MODULE

(71) Applicant: Samsung Electro-Mechanics Co., Ltd., Suwon-si (KR)

(72) Inventors: Jae Hyun Baik, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/887,820

(22) Filed: Oct. 20, 2015

(65) Prior Publication Data

US 2016/0154210 A1 Jun. 2, 2016

(30) Foreign Application Priority Data

Nov. 28, 2014 (KR) .......................... 10-2014-0168381

(51) Int. Cl.
| G02B 13/18 | (2006.01) |
| G02B 13/04 | (2006.01) |
| G02B 9/62 | (2006.01) |
| G02B 13/00 | (2006.01) |
| G02B 27/00 | (2006.01) |

(52) U.S. Cl.
CPC ............ *G02B 13/0045* (2013.01); *G02B 9/62* (2013.01); *G02B 27/0025* (2013.01)

(58) Field of Classification Search
CPC .............................. G02B 9/62; G02B 13/0045
USPC .................................. 359/713, 752, 756, 761
See application file for complete search history.

(56) References Cited

U.S. PATENT DOCUMENTS

| 2013/0050846 A1 | 2/2013 | Huang |
| 2014/0009844 A1 | 1/2014 | Tsai et al. |
| 2014/0092491 A1 | 4/2014 | Hsu et al. |
| 2014/0118844 A1 | 5/2014 | Tsai et al. |
| 2015/0124332 A1* | 5/2015 | Noda .................. G02B 13/0045 359/713 |
| 2015/0124333 A1 | 5/2015 | Noda et al. |

FOREIGN PATENT DOCUMENTS

| CN | 102955224 A | 3/2013 |
| WO | WO 2014/013677 A1 | 1/2014 |

OTHER PUBLICATIONS

Korean Office Action issued on Nov. 25, 2016 in counterpart Korean patent application No. 10-2014-0168381 (16 pages with English translation).

* cited by examiner

*Primary Examiner* — William Choi
(74) *Attorney, Agent, or Firm* — NSIP Law

(57) ABSTRACT

A lens module includes a first lens, an object-side surface thereof being concave, a second lens, an object-side surface thereof being convex, and an image-side surface thereof being convex, a third lens, an object-side surface thereof being concave, a fourth lens having refractive power, a fifth lens having refractive power, and a sixth lens having one or more inflection points on an image-side surface thereof, wherein the first to sixth lenses are sequentially disposed in numerical order from the first lens to the sixth lens starting at an object side of the lens module.

17 Claims, 20 Drawing Sheets

| SURFACE NO. | RADIUS OF CURVATURE | THICKNESS/ DISTANCE | REFRACTIVE INDEX | ABBE NUMBER | REMARKS |
|---|---|---|---|---|---|
| OBJECT | Infinity | Infinity | | | |
| 1 | -3.026 | 0.415 | 1.6504 | 21.52 | FIRST LENS |
| 2 | -5.848 | 0.210 | | | |
| ST | 1E+18 | -0.160 | | | STOP |
| 3 | 1.278 | 0.836 | 1.5441 | 56.09 | SECOND LENS |
| 4 | -3.963 | 0.404 | | | |
| 5 | -1.809 | 0.210 | 1.6504 | 21.52 | THIRD LENS |
| 6 | -1.887 | 0.055 | | | |
| 7 | -2.276 | 0.299 | 1.5441 | 56.09 | FOURTH LENS |
| 8 | -4.405 | 0.056 | | | |
| 9 | -5.233 | 0.210 | 1.6504 | 21.52 | FIFTH LENS |
| 10 | -5.274 | 0.126 | | | |
| 11 | 2.144 | 0.706 | 1.5348 | 55.71 | SIXTH LENS |
| 12 | 1.078 | 0.271 | | | |
| 13 | Infinity | 0.110 | | | FILTER |
| 14 | Infinity | 0.050 | | | |
| 15 | Infinity | 0.254 | | | |
| IMAGE PLANE | Infinity | 0.002 | | | |

FIG. 4

| FIRST EXAMPLE | 1 | 2 | 3 | 4 | 5 | 6 | 7 | 8 | 9 | 10 | 11 | 12 |
|---|---|---|---|---|---|---|---|---|---|---|---|---|
| RADIUS OF CURVATURE | -3.026 | -5.8484 | 1.2777 | -3.9625 | -1.8086 | -1.8867 | -2.2761 | -4.4055 | -5.2327 | -5.2740 | 2.1441 | 1.0784 |
| CONIC (K) | -13.3551 | -99.0000 | -0.5070 | -59.0757 | 2.3890 | -51.1988 | -99.0000 | -37.4956 | -11.9455 | 3.8751 | -15.8053 | -5.0762 |
| 4-TH ORDER (A) | -0.0045 | -0.0243 | -0.0506 | -0.2324 | -0.1064 | 0.2668 | 0.7636 | -0.4436 | -0.1825 | 0.1905 | -0.3829 | -0.1614 |
| 6-TH ORDER (B) | -0.0020 | 0.1448 | 0.2326 | 0.1545 | -1.0609 | -4.3472 | -5.2102 | 0.8995 | 0.5392 | -0.1582 | 0.2090 | 0.0993 |
| 8-TH ORDER (C) | 0.0564 | -0.1628 | -1.6037 | -0.3047 | 5.2744 | 14.1845 | 12.7113 | -1.9918 | -0.8804 | 0.0000 | -0.0383 | -0.0430 |
| 10-TH ORDER (D) | -0.1004 | 0.0397 | 7.5578 | 0.4215 | -7.9337 | -20.4776 | -15.4907 | 3.2452 | 0.7049 | 0.0621 | 0.0032 | 0.0115 |
| 12-TH ORDER (E) | 0.0790 | 0.1466 | -22.5939 | -0.6393 | 4.9906 | 15.0779 | 9.7530 | -2.4426 | -0.2766 | -0.0356 | -0.0031 | -0.0018 |
| 14-TH ORDER (F) | -0.0237 | -0.1159 | 35.4591 | 0.2563 | -1.2159 | -4.4826 | -2.5276 | 0.6488 | 0.0426 | 0.0078 | 0.0000 | 0.0001 |
| 16-TH ORDER (G) | 0.0000 | 0.0000 | -22.6932 | 0.0000 | 0.0000 | 0.0000 | 0.0000 | 0.0000 | 0.0000 | 0.0000 | 0.0000 | 0.0000 |

FIG. 5

| SURFACE NO. | RADIUS OF CURVATURE | THICKNESS/ DISTANCE | REFRACTIVE INDEX | ABBE NUMBER | REMARKS |
|---|---|---|---|---|---|
| OBJECT | Infinity | Infinity | | | |
| 1 | 11.447 | 0.243 | 1.6504 | 21.52 | FIRST LENS |
| 2 | 3.601 | 0.338 | | | |
| ST | 1E+18 | -0.160 | | | STOP |
| 3 | 1.253 | 0.691 | 1.5441 | 56.09 | SECOND LENS |
| 4 | -5.549 | 0.431 | | | |
| 5 | -2.615 | 0.210 | 1.6504 | 21.52 | THIRD LENS |
| 6 | -2.687 | 0.055 | | | |
| 7 | -3.169 | 0.314 | 1.5441 | 56.09 | FOURTH LENS |
| 8 | -3.299 | 0.050 | | | |
| 9 | 5.512 | 0.210 | 1.6504 | 21.52 | FIFTH LENS |
| 10 | 5.475 | 0.254 | | | |
| 11 | 1.889 | 0.545 | 1.5348 | 55.71 | SIXTH LENS |
| 12 | 0.922 | 0.278 | | | |
| 13 | Infinity | 0.110 | | | FILTER |
| 14 | Infinity | 0.050 | | | |
| 15 | Infinity | 0.255 | | | |
| 상면 | Infinity | -0.001 | | | |

FIG. 9

| SECOND EXAMPLE | 1 | 2 | 3 | 4 | 5 | 6 | 7 | 8 | 9 | 10 | 11 | 12 |
|---|---|---|---|---|---|---|---|---|---|---|---|---|
| RADIUS OF CURVATURE | 11.4467 | 3.6006 | 1.2529 | -5.5491 | -2.6146 | -2.6872 | -3.1690 | -3.2991 | 5.5119 | 5.4745 | 1.8887 | 0.9224 |
| CONIC (K) | 99.0000 | -99.0000 | -0.8424 | -59.0757 | 6.2989 | -51.1988 | -99.0000 | -37.4956 | -11.9455 | 11.6631 | -15.8063 | -4.2795 |
| 4-TH ORDER (A) | -0.0615 | 0.1373 | -0.1038 | -0.1836 | -0.1632 | 0.3589 | 0.7702 | -0.4715 | -0.3556 | 0.0089 | -0.3776 | -0.2274 |
| 6-TH ORDER (B) | 0.1495 | -0.3356 | 0.2143 | -0.0497 | -0.9565 | -4.6393 | -5.0739 | 1.2694 | 0.7834 | -0.1222 | 0.2032 | 0.1738 |
| 8-TH ORDER (C) | -0.1088 | 1.5760 | -0.0366 | 0.0935 | 3.8779 | 13.8529 | 12.6252 | -2.5762 | -1.3989 | 0.0596 | -0.0414 | -0.0935 |
| 10-TH ORDER (D) | 0.0043 | -3.3727 | -2.0981 | -0.2757 | -3.7964 | -18.3406 | -16.1849 | 3.0435 | 1.3258 | 0.0164 | 0.0039 | 0.0310 |
| 12-TH ORDER (E) | 0.0623 | 3.8637 | 6.9927 | 0.4279 | 0.3513 | 12.0409 | 10.5770 | -1.6802 | -0.6064 | -0.0219 | -0.0002 | -0.0059 |
| 14-TH ORDER (F) | -0.0345 | -1.7415 | -10.1377 | -0.5483 | 0.6041 | -3.0643 | -2.7541 | 0.3278 | 0.1028 | 0.0049 | 0.0000 | 0.0005 |
| 16-TH ORDER (G) | 0.0000 | 0.0000 | 5.1342 | 0.0000 | 0.0000 | 0.0000 | 0.0000 | 0.0000 | 0.0000 | 0.0000 | 0.0000 | 0.0000 |

FIG. 10

| SURFACE NO. | RADIUS OF CURVATURE | THICKNESS/ DISTANCE | REFRACTIVE INDEX | ABBE NUMBER | REMARKS |
|---|---|---|---|---|---|
| OBJECT | Infinity | Infinity | | | |
| 1 | 11.195 | 0.210 | 1.6504 | 21.52 | FIRST LENS |
| 2 | 3.417 | 0.372 | | | |
| ST | 1E+18 | -0.160 | | | STOP |
| 3 | 1.262 | 0.584 | 1.5441 | 56.09 | SECOND LENS |
| 4 | -3.874 | 0.390 | | | |
| 5 | -3.596 | 0.210 | 1.6504 | 21.52 | THIRD LENS |
| 6 | -3.659 | 0.055 | | | |
| 7 | -4.852 | 0.307 | 1.5441 | 56.09 | FOURTH LENS |
| 8 | -5.004 | 0.050 | | | |
| 9 | 5.321 | 0.210 | 1.6504 | 21.52 | FIFTH LENS |
| 10 | 5.281 | 0.174 | | | |
| 11 | 1.164 | 0.406 | 1.5348 | 55.71 | SIXTH LENS |
| 12 | 0.715 | 0.286 | | | |
| 13 | Infinity | 0.110 | | | FILTER |
| 14 | Infinity | 0.050 | | | |
| 15 | Infinity | 0.255 | | | |
| 상면 | Infinity | -0.001 | | | |

FIG. 14

| THIRD EXAMPLE | 1 | 2 | 3 | 4 | 5 | 6 | 7 | 8 | 9 | 10 | 11 | 12 |
|---|---|---|---|---|---|---|---|---|---|---|---|---|
| RADIUS OF CURVATURE | 11.1945 | 3.4169 | 1.2622 | -3.8735 | -3.5956 | -3.6589 | -4.8515 | -5.0043 | 5.3213 | 5.2808 | 1.1639 | 0.7154 |
| CONIC (K) | 99.0000 | -99.0000 | -0.8865 | -59.0757 | 18.4601 | -51.1987 | -99.0000 | -37.4955 | -11.9453 | 9.6554 | -7.3002 | -3.5173 |
| 4-TH ORDER (A) | -0.0541 | 0.2541 | -0.0549 | -0.2989 | -0.2429 | 0.5756 | 1.2785 | -0.5992 | -0.5543 | 0.1050 | -0.4696 | -0.3555 |
| 6-TH ORDER (B) | 0.2364 | -0.3756 | 0.2515 | 0.1303 | -1.0415 | -7.2260 | -8.6316 | 2.3732 | 1.7723 | -0.1246 | 0.2654 | 0.3372 |
| 8-TH ORDER (C) | -0.4507 | 1.1202 | -2.2669 | -0.7315 | 4.6137 | 24.6104 | 26.5397 | -4.4383 | -3.3652 | -0.2972 | -0.0592 | -0.2265 |
| 10-TH ORDER (D) | 0.6169 | -1.7373 | 13.5041 | 2.0897 | -5.6021 | -40.2874 | -44.0392 | 4.2576 | 2.7237 | 0.4561 | 0.0061 | 0.0906 |
| 12-TH ORDER (E) | -0.4997 | 1.7658 | -56.7402 | -4.5372 | 2.5501 | 33.8608 | 38.1666 | -2.1075 | -1.0267 | -0.2354 | -0.0003 | -0.0200 |
| 14-TH ORDER (F) | 0.1657 | -0.8489 | 125.0111 | 2.5486 | -0.3766 | -11.1840 | -13.9350 | 0.4062 | 0.1477 | 0.0440 | 0.0000 | 0.0018 |
| 16-TH ORDER (G) | 0.0000 | 0.0000 | -114.1302 | 0.0000 | 0.0000 | 0.0000 | 0.0000 | 0.0000 | 0.0000 | 0.0000 | 0.0000 | 0.0000 |

FIG. 15

| SURFACE NO. | RADIUS OF CURVATURE | THICKNESS/ DISTANCE | REFRACTIVE INDEX | ABBE NUMBER | REMARKS |
|---|---|---|---|---|---|
| OBJECT | Infinity | Infinity | | | |
| 1 | 12.197 | 0.210 | 1.6504 | 21.52 | FIRST LENS |
| 2 | 3.547 | 0.448 | | | |
| ST | 1E+18 | -0.160 | | | STOP |
| 3 | 1.161 | 0.647 | 1.5441 | 56.09 | SECOND LENS |
| 4 | -4.714 | 0.377 | | | |
| 5 | -2.585 | 0.210 | 1.6504 | 21.52 | THIRD LENS |
| 6 | -2.658 | 0.055 | | | |
| 7 | -3.199 | 0.323 | 1.5441 | 56.09 | FOURTH LENS |
| 8 | -3.333 | 0.050 | | | |
| 9 | 5.122 | 0.210 | 1.6504 | 21.52 | FIFTH LENS |
| 10 | 5.078 | 0.203 | | | |
| 11 | 1.479 | 0.399 | 1.5348 | 55.71 | SIXTH LENS |
| 12 | 0.769 | 0.263 | | | |
| 13 | Infinity | 0.110 | | | FILTER |
| 14 | Infinity | 0.050 | | | |
| 15 | Infinity | 0.254 | | | |
| 상면 | Infinity | 0.000 | | | |

FIG. 19

| FOURTH EXAMPLE | 1 | 2 | 3 | 4 | 5 | 6 | 7 | 8 | 9 | 10 | 11 | 12 |
|---|---|---|---|---|---|---|---|---|---|---|---|---|
| RADIUS OF CURVATURE | 12.1966 | 3.5473 | 1.1613 | -4.7138 | -2.5852 | -2.6580 | -3.1990 | -3.3325 | 5.1219 | 5.0781 | 1.4792 | 0.7694 |
| CONIC (K) | 99.0000 | -99.0000 | -0.7322 | -59.0757 | 10.7237 | -51.1988 | -99.0000 | -37.4956 | -11.9455 | 10.8145 | -15.8063 | -4.4556 |
| 4-TH ORDER (A) | -0.0519 | 0.2111 | -0.0467 | -0.2072 | -0.1839 | 0.3261 | 0.8680 | -0.7584 | -0.7158 | 0.0121 | -0.3921 | -0.2995 |
| 6-TH ORDER (B) | 0.1631 | -0.4454 | 0.1846 | -0.0269 | -1.0288 | -5.2587 | -6.2402 | 2.6656 | 1.8976 | -0.1545 | 0.2145 | 0.2815 |
| 8-TH ORDER (C) | -0.1637 | 1.6117 | -0.3344 | -0.1218 | 4.5193 | 17.0296 | 17.6630 | -5.1683 | -3.2937 | 0.0580 | -0.0458 | -0.1959 |
| 10-TH ORDER (D) | 0.0894 | -3.1398 | -3.2859 | 0.3358 | -4.2373 | -24.0412 | -26.5148 | 5.1809 | 2.7932 | 0.0339 | 0.0045 | 0.0850 |
| 12-TH ORDER (E) | -0.0064 | 3.4578 | 19.2673 | -0.9318 | 17.1405 | 17.1405 | 21.0433 | -2.3626 | -1.1329 | -0.0300 | -0.0002 | -0.0212 |
| 14-TH ORDER (F) | -0.0126 | -1.5587 | -42.0831 | -0.3165 | 1.3327 | -4.8849 | -6.9215 | 0.3757 | 0.1743 | 0.0058 | 0.0000 | 0.0022 |
| 16-TH ORDER (G) | 0.0000 | 0.0000 | 31.0415 | 0.0000 | 0.0000 | 0.0000 | 0.0000 | 0.0000 | 0.0000 | 0.0000 | 0.0000 | 0.0000 |

FIG. 20

LENS MODULE

CROSS-REFERENCE TO RELATED APPLICATION(S)

This application claims the benefit of Korean Patent Application No. 10-2014-0168381 filed on Nov. 28, 2014, in the Korean Intellectual Property Office, the entire disclosure of which is incorporated herein by reference for all purposes.

BACKGROUND

1. Field

This application relates to a lens module having an optical system including six lenses.

2. Description of Related Art

A lens module mounted in a camera module provided in a mobile communications terminal includes a plurality of lenses. For example, the lens module may include six lenses in order to configure a high-resolution optical system.

However, when the high-resolution optical system is configured using the plurality of lenses as described above, a length of the optical system (the distance from an object-side surface of a first lens to an image plane) may be increased. In this case, it may be difficult to mount the lens module in a thin mobile communications terminal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens module includes a first lens, an object-side surface thereof being concave; a second lens, an object-side surface thereof being convex, and an image-side surface thereof being convex; a third lens, an object-side surface thereof being concave; a fourth lens having refractive power; a fifth lens having refractive power; and a sixth lens having one or more inflection points on an image-side surface thereof; wherein the first to sixth lenses are sequentially disposed in numerical order from the first lens to the sixth lens starting at an object side of the lens module.

An image-side surface of the first lens may be convex.

An image-side surface of the third lens may be convex.

An object-side surface of the fourth lens may be concave, and an image-side surface of the fourth lens may be convex.

An object-side surface of the fifth lens may be concave, and an image-side surface of the fifth lens may be convex.

An object-side surface of the sixth lens may be convex, and the image-side surface of the sixth lens may be concave.

In another general aspect a lens module includes a first lens having negative refractive power; a second lens, an object-side surface thereof being convex, and an image-side surface thereof being convex; a third lens, an object-side surface thereof being concave, and an image-side surface thereof being convex; a fourth lens having refractive power; a fifth lens, an image-side surface thereof being concave; and a sixth lens having one or more inflection points on an image-side surface thereof; wherein the first to sixth lenses are sequentially disposed in numerical order from the first lens to the sixth lens starting at an object side of the lens module; and TTL/D23<11.0 is satisfied, where TTL is a distance from an object-side surface of the first lens to an image plane of the lens module, and D23 is a distance from the image-side surface of the second lens to the object-side surface of the third lens.

The third lens may have positive refractive power or the fourth lens may have negative refractive power.

The fifth lens may have positive refractive power or the sixth lens may have negative refractive power.

In the lens module, 0.7<f12/f<0.9 may be satisfied, where f12 is a composite focal length of the first and second lenses, and f is an overall focal length of an optical system including the first to sixth lenses.

In the lens module, BFL/f<0.3 may be satisfied, where BFL is a distance from the image-side surface of the sixth lens to the image plane, and f is an overall focal length of an optical system including the first to sixth lenses.

In the lens module, 0.4<r3/f may be satisfied, where r3 is a radius of curvature of the object-side surface of the second lens, and f is an overall focal length of an optical system including the first to sixth lenses.

In the lens module, 30<|V1−V2|<40 may be satisfied, where V1 is an Abbe number of the first lens, and V2 is an Abbe number of the second lens.

In the lens module, −0.1<(r9−r10)/(r9+r10) may be satisfied, where r9 is a radius of curvature of an object-side surface of the fifth lens, and r10 is a radius of curvature of the image-side surface of the fifth lens.

In the lens module, −0.4<(r1−r2)/(r1+r2)<0.6 may be satisfied, where r1 is a radius of curvature of the object-side surface of the first lens, and r2 is a radius of curvature of an image-side surface of the first lens.

In the lens module, SL/TTL<0.85 may be satisfied, where SL is a distance from a stop to the image plane, and TTL is a distance from the object-side surface of the first lens to the image plane.

The stop may be disposed between the first lens and the second lens.

Other features and aspects will be apparent from the following detailed description, the drawings, and the claims.

BRIEF DESCRIPTION OF THE DRAWINGS

FIG. 4 is a table representing characteristics of the lenses of the lens module illustrated in FIG. 1.

FIG. 5 is a table representing aspherical surface coefficients of the lenses of the lens module illustrated in FIG. 1.

FIG. 9 is a table representing characteristics of the lenses of the lens module illustrated in FIG. 6.

FIG. 10 is a table representing aspherical surface coefficients of the lenses of the lens module illustrated in FIG. 6.

FIG. 14 is a table representing characteristics of the lenses of the lens module illustrated in FIG. 11.

FIG. 15 is a table representing aspherical surface coefficients of the lenses of the lens module illustrated in FIG. 11.

FIG. 19 is a table representing characteristics of the lenses of the lens module illustrated in FIG. 16.

FIG. 20 is a table representing aspherical surface coefficients of the lenses of the lens module illustrated in FIG. 16.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
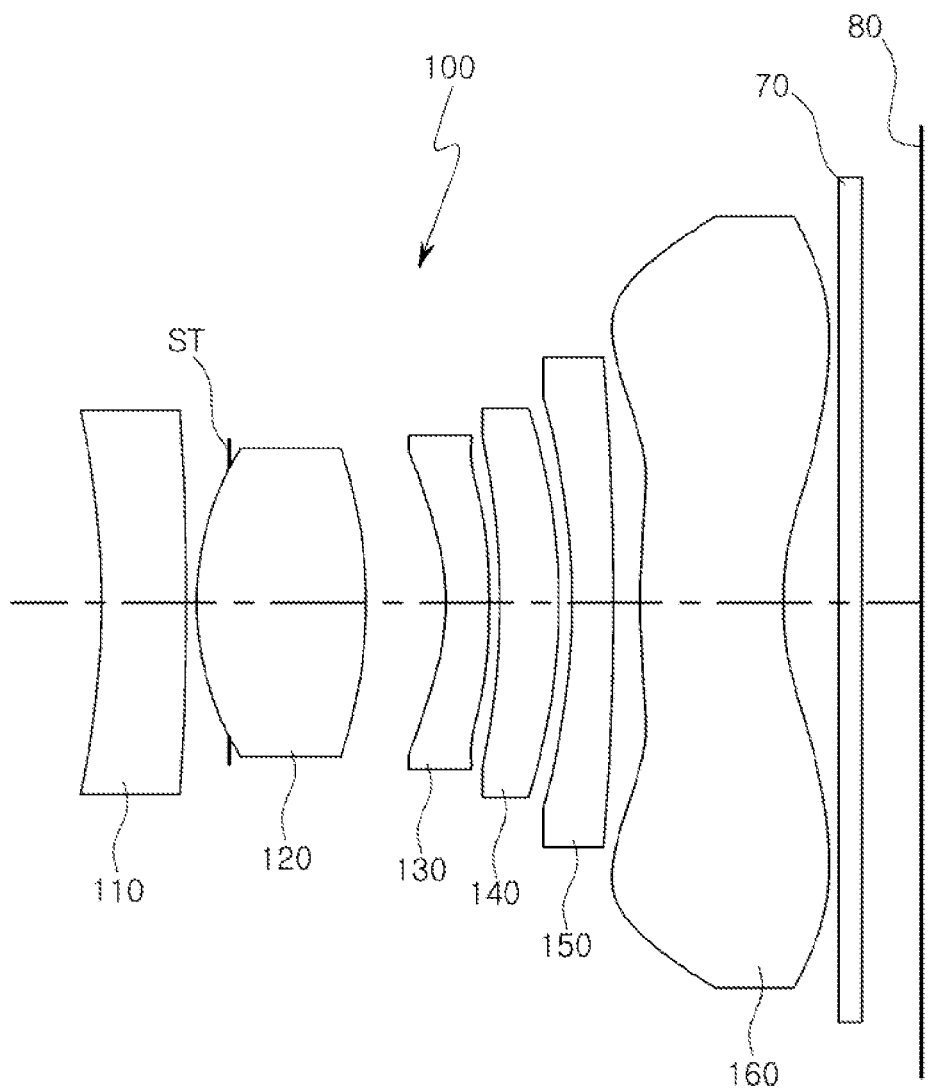
FIG. 1 is a view of a first example of a lens module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In this application, a first lens refers to a lens closest to an object (or a subject), while a sixth lens refers to a lens closest to an image plane (or an image sensor). Further, a first surface of each lens refers to a surface thereof closest to an object (or a subject), and a second surface of each lens refers to a surface thereof closest to an image plane (or an image sensor). Further, all of radii of curvature, thicknesses, OALs (optical axis distances from a first surface of the first lens to the image plane), SLs (distances from a stop to the image plane), IMGHs (image heights), and BFLs (back focus lengths) of the lenses, an overall focal length of an optical system, and a focal length of each lens are expressed in millimeters (mm). Further, thicknesses of lenses, gaps between the lenses, OALs, and SLs are distances measured in relation to an optical axis of the lenses. Further, in a description for shapes of the lenses, a statement that one surface of a lens is convex means that an optical axis portion of a corresponding surface is convex, and a statement that one surface of a lens is concave means that an optical axis portion of a corresponding surface is concave. Therefore, although it may be described that one surface of a lens is convex, an edge portion of the lens may be concave. Likewise, although it may be described that one surface of a lens is concave, an edge portion of the lens may be convex.

A lens module includes an optical system including a plurality of lenses. As an example, the optical system of the lens module may include six lenses having refractive power. However, the lens module is not limited thereto. For example, the lens module may include other components that do not have refractive power. As an example, the lens module may include a stop controlling an amount of light. As another example, the lens module may further include an infrared cut-off filter filtering infrared light. As another example, the lens module may further include an image sensor (that is, an imaging device) converting an image of a subject incident thereon through the optical system into electrical signals. As another example, the lens module may further include a gap maintaining member adjusting a gap between lenses.

First to sixth lenses may be formed of materials having a refractive index different from that of air. For example, the first to sixth lenses may be formed of plastic or glass. At least one of the first to sixth lenses may have an aspherical surface shape. As an example, only the sixth lens of the first to sixth lenses may have an aspherical surface shape. As another example, at least one surface of all of the first to sixth lenses may be aspherical. Here, the aspherical surface of each lens may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + gr^{16} + Hr^{18} + Jr^{20} \tag{1}$$

Here, c is an inverse of a radius of curvature of a corresponding lens, k is a conic constant, and r is a distance from a certain point on an aspherical surface to an optical axis in a direction perpendicular to the optical axis. In addition, constants A to J are respectively 4-th order to 20-th order aspherical surface coefficients. In addition, Z is a distance between the certain point on the aspherical surface at the distance r and a tangential plane meeting the apex of the aspherical surface of the lens.

The lens module may have a wide field of view (FOV) of 80° or more. Therefore, the lens module may easily photograph a wide background or object.

Next, main components of the lens module will be described.

The first lens may have refractive power. For example, the first lens may have negative refractive power.

The first lens may have a meniscus shape. As an example, the first lens may have a meniscus shape of which a first surface (object-side surface) is concave and a second surface (image-side surface) is convex. As another example, the first lens may have a meniscus shape of which a first surface is convex and a second surface is concave.

The first lens may have an aspherical surface. For example, both surfaces of the first lens may be aspherical. The first lens may be formed of a material having high light transmissivity and excellent workability. For example, the first lens may be formed of plastic. However, a material of the first lens is not limited to plastic. For example, the first lens may be formed of glass.

The first lens may be formed of a material having a high refractive index. For example, the first lens may be formed of a material having a refractive index of 1.60 or more (in this case, the first lens may have an Abbe number of 30 or less). The first lens formed of this material may easily refract light even while having a small degree of curvature. Therefore, the first lens formed of this material may be easily manufactured and be usefully used in lowering a defect rate depending on a manufacturing tolerance. In addition, the first lens formed of this material may decrease a distance between lenses, such that it may be useful to miniature the lens module.

The second lens may have refractive power. For example, the second lens may have positive refractive power.

Both surfaces of the second lens may be convex. As an example, a first surface of the second lens may be convex, and a second surface of the second lens may be convex.

The second lens may have an aspherical surface. For example, both surfaces of the second lens may be aspherical. The second lens may be formed of a material having high light transmissivity and excellent workability. For example, the second lens may be formed of plastic. However, a material of the second lens is not limited to plastic. For example, the second lens may be formed of glass.

The third lens may have refractive power. For example, the third lens may have positive refractive power.

The third lens may have a meniscus shape of which an image-side surface is convex. As an example, a first surface of the third lens may be concave, and a second surface of the third lens may be convex.

The third lens may have an aspherical surface. For example, both surfaces of the third lens may be aspherical. The third lens may be formed of a material having high light transmissivity and excellent workability. For example, the third lens may be formed of plastic. However, a material of the third lens is not limited to plastic. For example, the third lens may be formed of glass.

The third lens may be formed of a material having a high refractive index. For example, the third lens may be formed of a material having a refractive index of 1.60 or more (in this case, the third lens may have an Abbe number of 30 or less). The third lens formed of this material may easily refract light even while having a small degree of curvature. Therefore, the third lens formed of this material may be easily manufactured and be useful in lowering a defect rate depending on a manufacturing tolerance. In addition, the third lens formed of this material may decrease a distance between lenses, such that it may be useful in miniaturizing the lens module.

The fourth lens may have refractive power. For example, the fourth lens may have negative refractive power.

The fourth lens may have a meniscus shape of which an image-side surface is convex. For example, a first surface of the fourth lens may be concave and a second surface of the fourth lens may be convex.

The fourth lens may have an aspherical surface. For example, both surfaces of the fourth lens may be aspherical. The fourth lens may be formed of a material having high light transmissivity and excellent workability. For example, the fourth lens may be formed of plastic. However, a material of the fourth lens is not limited to plastic. For example, the fourth lens may be formed of glass.

The fifth lens may have refractive power. For example, the fifth lens may have positive refractive power.

The fifth lens may have a meniscus shape. As an example, the fifth lens may have a meniscus shape of which a first surface is concave and a second surface is convex. As another example, the fifth lens may have a meniscus shape of which a first surface is convex and a second surface is concave.

The fifth lens may have an aspherical surface. For example, both surfaces of the fifth lens may be aspherical. In addition, the fifth lens may have an aspherical surface shape including an inflection point. As an example, one or more inflection points may be formed on the image-side surface of the fifth lens.

The fifth lens may be formed of a material having high light transmissivity and excellent workability. For example, the fifth lens may be formed of plastic. However, a material of the fifth lens is not limited to plastic. For example, the fifth lens may be formed of glass.

The fifth lens may be formed of a material having a high refractive index. For example, the fifth lens may be formed of a material having a refractive index of 1.60 or more (in this case, the fifth lens may have an Abbe number of 30 or less). The fifth lens formed of this material may easily refract light even while having a small degree of curvature. Therefore, the fifth lens formed of this material may be easily manufactured and be useful in lowering a defect rate depending on a manufacturing tolerance. In addition, the fifth lens formed of this material may decrease a distance between lenses, such that it may be useful in miniaturizing the lens module.

The sixth lens may have refractive power. For example, the sixth lens may have negative refractive power.

The sixth lens may have a meniscus shape of which an object-side surface is convex. As an example, a first surface of the sixth lens may be convex, and a second surface of the sixth lens may be concave.

The sixth lens may have an aspherical surface. For example, both surfaces of the sixth lens may be aspherical. In addition, the sixth lens may have an aspherical surface including an inflection point. As an example, one or more inflection points may be formed on an object-side surface and an image-side surface of the sixth lens. The first surface of the sixth lens having the inflection point may be convex at the center of an optical axis, be concave in the vicinity of the optical axis, and again be convex at an edge thereof. In addition, the second surface of the sixth lens may be concave at the center of an optical axis and become convex at an edge thereof. The sixth lens may be formed of a material having high light transmissivity and high workability. For example, the sixth lens may be formed of plastic. However, a material of the sixth lens is not limited to plastic. For example, the sixth lens may be formed of glass.

The image sensor may be configured to realize a high resolution of 1300 megapixels. For example, a unit size of the pixels of the image sensor may be 1.12 μm or less.

The lens module may be configured to have a wide field of view. For example, the optical system of the lens module may have a field of view of 80° or more. In addition, the lens module may be configured to have a relatively short length (TTL). For example, an overall length (distance from the object-side surface of the first lens to the image plane) of the optical system configuring the lens module may be 4.10 mm or less. Therefore, the lens module may be significantly miniaturized.

The optical system of the lens module configured as described above may satisfy the following Conditional Expression:

$$0.7 < f12/f < 0.9$$

Here, f12 is a composite focal length of the first and second lenses, and f is an overall focal length of the optical system including the first to sixth lenses.

The above Conditional Expression is an optimized condition for correcting aberration and miniaturizing the optical system. As an example, in a case in which f12/f is outside of a lower limit value of the above Conditional Expression, refractive power of the first and second lenses of the optical system may be excessively large, such that it may be difficult to correct spherical aberration. As another example, in a case in which f12/f is outside of an upper limit value of the above Conditional Expression, while the optical system may be useful in correcting aberration, it may be difficult to miniaturize the optical system.

In addition, the optical system of the lens module may satisfy the following Conditional Expression:

$$TTL/D23<11.0$$

Here, TTL is a distance from the object-side surface of the first lens to an image plane, and D23 is a distance from an image-side surface of the second lens to an object-side surface of the third lens.

The above Conditional Expression is an optimized condition for manufacturing the optical system. As an example, in a case in which TTL/D23 is outside of an upper limit value of the above Conditional Expression, it may be difficult for a desired degree of performance to be realized in the optical system.

In addition, the optical system of the lens module may satisfy the following Conditional Expression:

$$BFL/f<0.3$$

Here, BFL is a distance from the image-side surface of the sixth lens to the image plane, and f is the overall focal length of the optical system including the first to sixth lenses.

The above Conditional Expression is an optimized condition for manufacturing the optical system. As an example, in a case in which BFL/f is outside of an upper limit value of the above Conditional Expression, it may be difficult for a desired degree of performance to be realized in the optical system.

In addition, the optical system of the lens module may satisfy the following Conditional Expression:

$$0.4<r3/f$$

Here, r3 is a radius of curvature of an object-side surface of the second lens, and f is the overall focal length of the optical system including the first to sixth lenses.

The above Conditional Expression is an optimized condition for manufacturing the second lens. As an example, in a case in which r3/f is outside of a lower limit value of the above Conditional Expression, the second lens may be sensitive to a manufacturing tolerance, such that it may be difficult to manufacture the second lens.

In addition, the optical system of the lens module may satisfy the following Conditional Expression:

$$30<|V1-V2|<40$$

Here, V1 is an Abbe number of the first lens, and V2 is an Abbe number of the second lens.

The above Conditional Expression is one condition for improving aberration correction. As an example, in a case in which |V1−V2| is outside of a range of the above Conditional Expression in a combination of the first and second lenses, aberration correction may be difficult.

In addition, the optical system of the lens module may satisfy the following Conditional Expression:

$$-0.1<(r9-r10)/(r9+r10)$$

Here, r9 is a radius of curvature of an object-side surface of the fifth lens, and r10 is a radius of curvature of the image-side surface of the fifth lens.

The above Conditional Expression is a condition of significantly increasing an aberration correction effect by the fifth lens. As an example, in a case in which (r9−r10)/(r9+r10) is outside of a numerical range of the above Conditional Expression with respect to a shape of the fifth lens, aberration correction may be difficult.

In addition, the optical system of the lens module may satisfy the following Conditional Expression:

$$-0.4<(r1-r2)/(r1+r2)<0.6$$

Here, r1 is a radius of curvature of the object-side surface of the first lens, and r2 is a radius of curvature of the image-side surface of the first lens.

The above Conditional Expression is a condition of significantly increasing an aberration correction effect by the first lens. As an example, in a case in which (r1−r2)/(r1+r2) is outside of a lower limit value of the above Conditional Expression with respect to a shape of the first lens, aberration correction may be difficult.

In addition, the optical system of the lens module may satisfy the following Conditional Expression:

$$SL/TTL<0.85$$

Here, SL is a distance from the stop to the image plane, and TTL is a distance from the object-side surface of the first lens to the image plane.

The above Conditional Expression is one condition for significantly increasing an aberration correction effect. As an example, in a case in which SL/TTL is outside of an upper limit value of the above Conditional Expression in the optical system, aberration correction may be difficult.

FIG. 1 is a view of a first example of a lens module.

A lens module 100 includes an optical system including a first lens 110, a second lens 120, a third lens 130, a fourth lens 140, a fifth lens 150, and a sixth lens 160. In addition, the lens module 100 further includes an infrared cut-off filter 70 and an image sensor 80. Further, the lens module 100 further includes a stop (ST). In this example, the stop is disposed between the first lens 110 and the second lens 120.

In this example, the first lens 110 has negative refractive power, and an object-side surface thereof is concave and an image-side surface thereof is convex. The second lens 120 has positive refractive power, and an object-side surface thereof is convex and an image-side surface thereof is convex. The third lens 130 has positive refractive power, and an object-side surface thereof is concave and an image-side surface thereof is convex. The fourth lens 140 has negative refractive power, and an object-side surface thereof is concave and an image-side surface thereof is convex. The fifth lens 150 has positive refractive power, and an object-side surface thereof is concave and an image-side surface thereof is convex. In addition, one or more inflection points are formed on each of the object-side surface and the image-side surface of the fifth lens. The sixth lens 160 has negative refractive power, and an object-side surface thereof is convex and an image-side surface thereof is concave. In addition, one or more inflection points are formed on each of the object-side surface and the image-side surface of the sixth lens.

Figure 2:
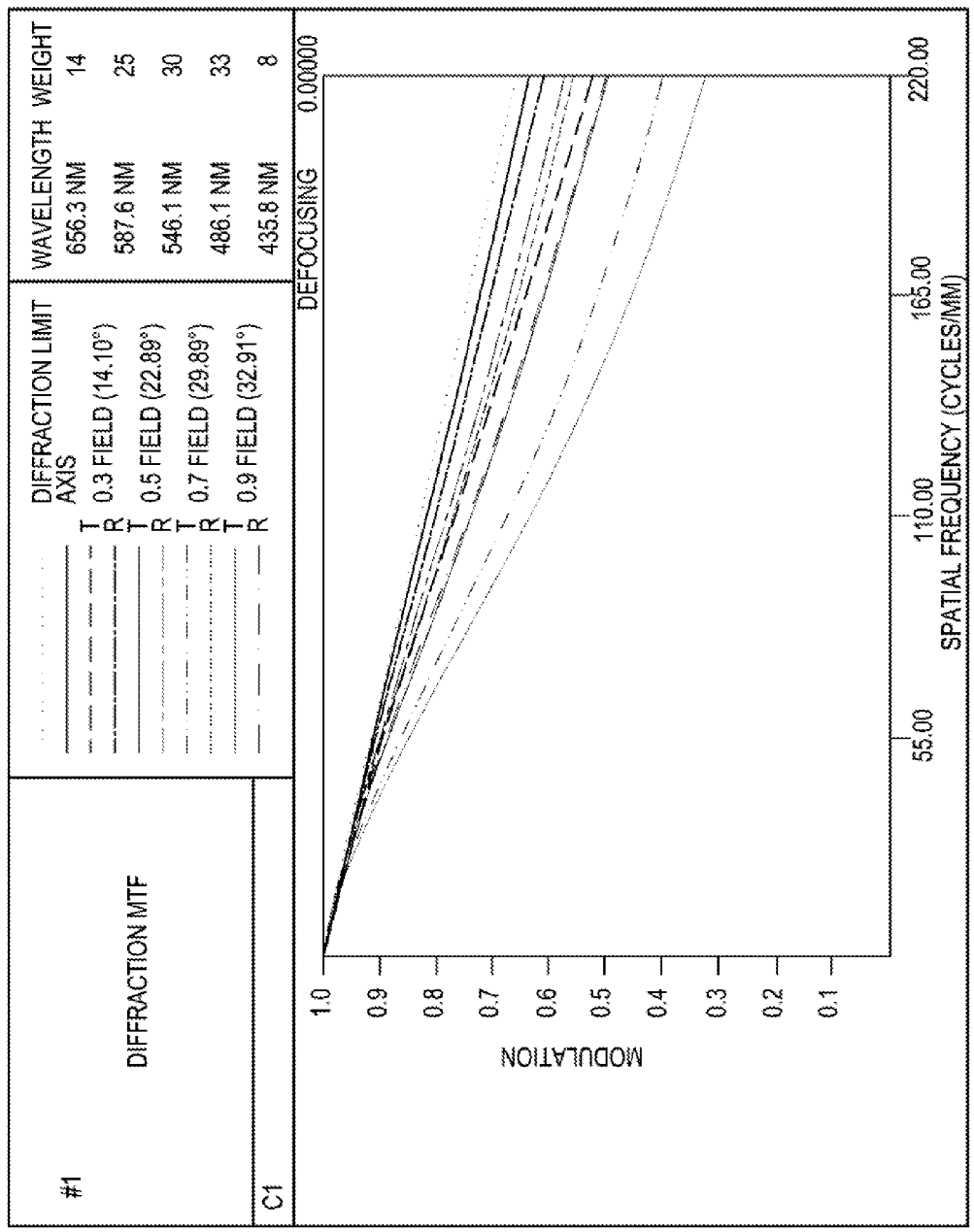
FIG. 2 is a graph including curves representing modulation transfer function (MTF) characteristics of the lens module illustrated in FIG. 1.

FIG. 2 is a graph including curves representing MTF characteristics of the lens module illustrated in FIG. 1.

Figure 3:
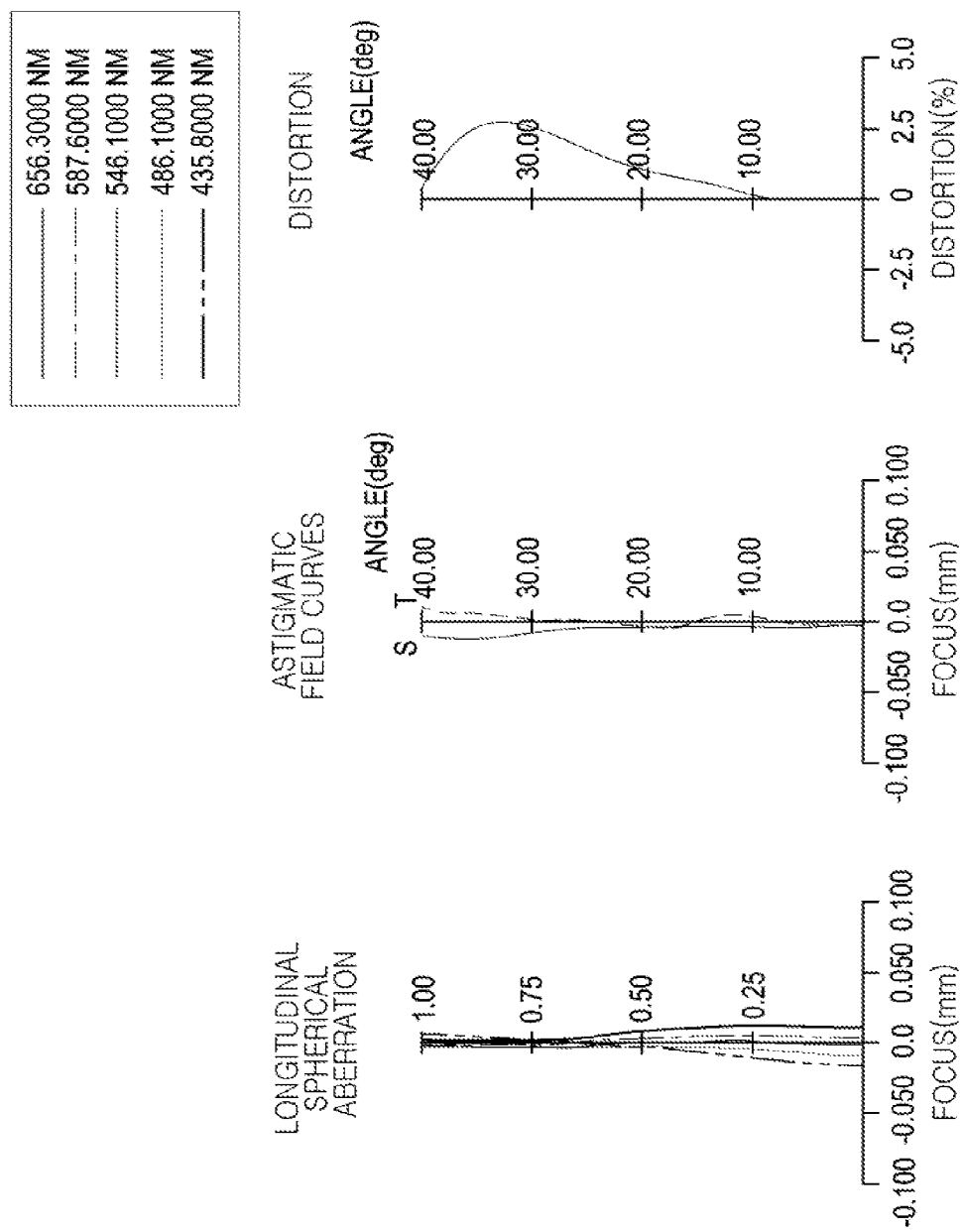
FIG. 3 is a graph including curves representing aberration characteristics of the lens module illustrated in FIG. 1.

FIG. 3 is a graph including curves representing aberration characteristics of the lens module illustrated in FIG. 1.

FIG. 4 is a table representing characteristics of the lenses of the lens module illustrated in FIG. 1. In FIG. 4, Surface Nos. 1 and 2 indicate the first surface (object-side surface) and the second surface (image-side surface) of the first lens, and Surface Nos. 3 and 4 indicate the first and second surfaces of the second lens. Similarly, Surface Nos. 5 to 12 indicate first and second surfaces of the third to sixth lenses, respectively. In addition, Surface Nos. 13 and 14 indicate first and second surfaces of the infrared cut-off filter.

FIG. 5 is a table representing aspherical surface coefficients of the lenses of the lens module illustrated in FIG. 1. In FIG. 5, the labels of the columns are Surface Nos. of the first to sixth lenses.

Figure 6:
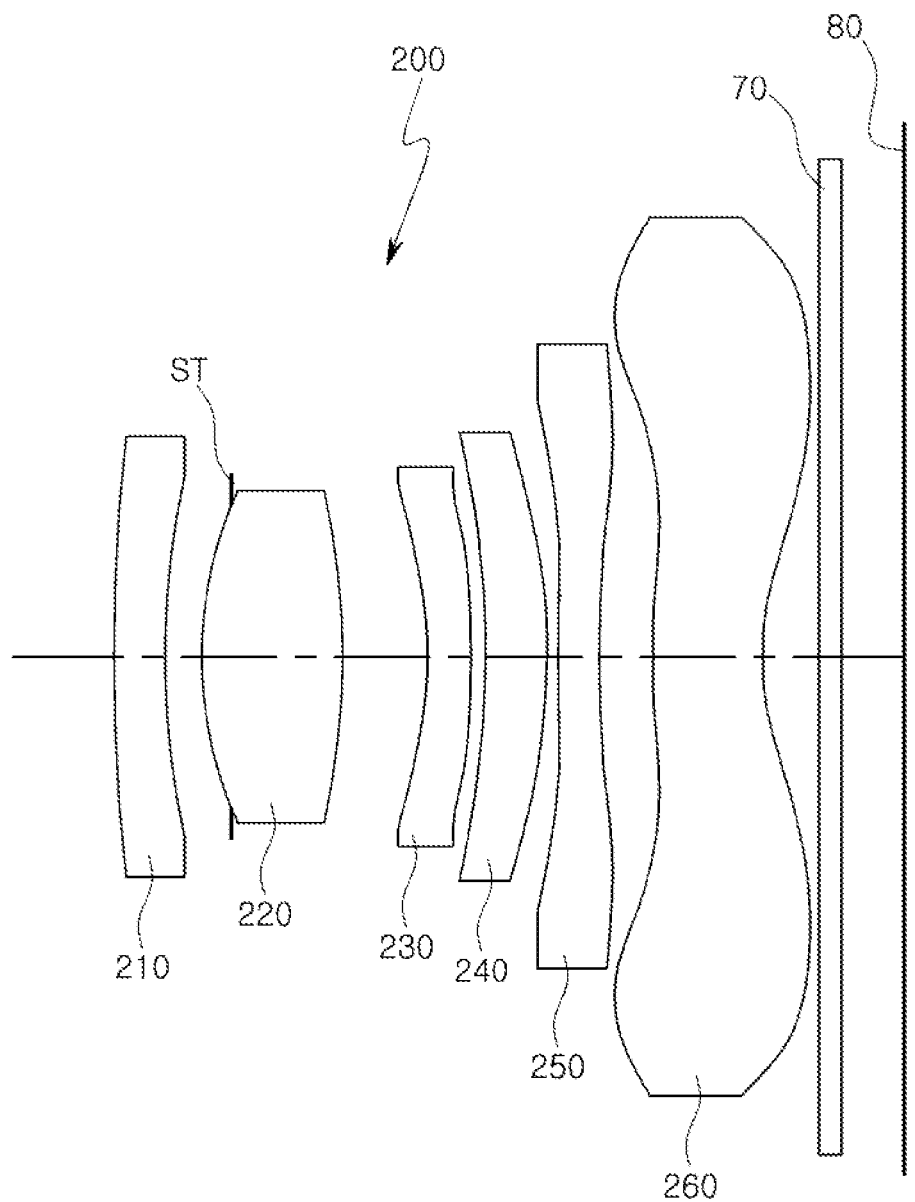
FIG. 6 is a view of a second example of a lens module.

FIG. 6 is a view of a second example of a lens module.

A lens module 200 includes an optical system including a first lens 210, a second lens 220, a third lens 230, a fourth lens 240, a fifth lens 250, and a sixth lens 260. In addition, the lens module 200 further includes an infrared cut-off filter 70 and an image sensor 80. Further, the lens module 200 further includes a stop (ST). In this example, the stop is disposed between the first lens 210 and the second lens 220.

In this example, the first lens 210 has negative refractive power, an object-side surface thereof is convex and an image-side surface thereof is concave. The second lens 220 has positive refractive power, and an object-side surface thereof is convex and an image-side surface thereof is convex. The third lens 230 has positive refractive power, and an object-side surface thereof is concave and an image-side surface thereof is convex. The fourth lens 240 has negative refractive power, and an object-side surface thereof is concave and an image-side surface thereof is convex. The fifth lens 250 has positive refractive power, and an object-side surface thereof is convex and an image-side surface thereof is concave. In addition, one or more inflection points are formed on each of the object-side surface and the image-side surface of the fifth lens. The sixth lens 260 has negative refractive power, and an object-side surface thereof is convex and an image-side surface thereof is concave. In addition, one or more inflection points are formed on each of the object-side surface and the image-side surface of the sixth lens.

Figure 7:
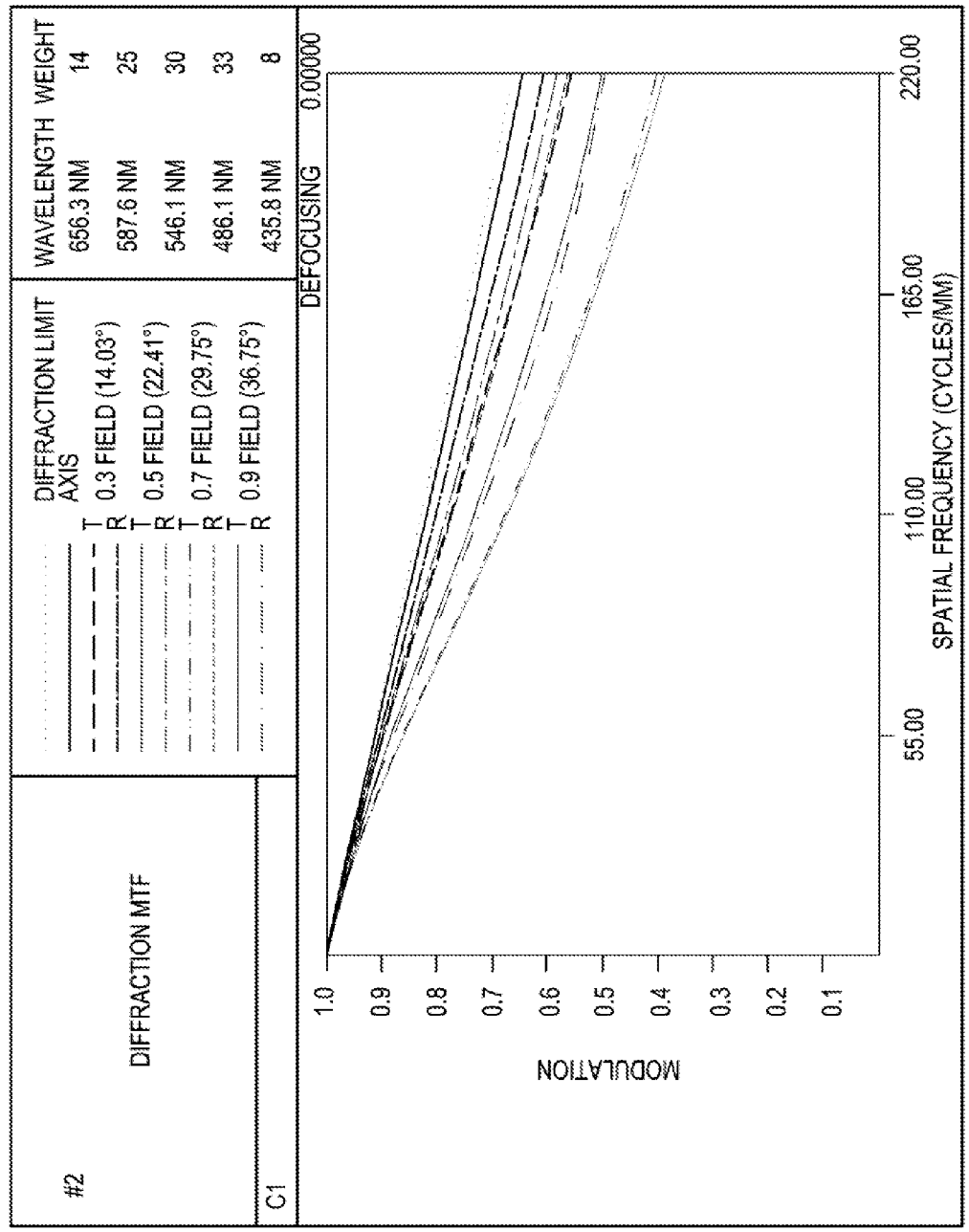
FIG. 7 is a graph including curves representing MTF characteristics of the lens module illustrated in FIG. 6.

FIG. 7 is a graph including curves representing MTF characteristics of the lens module illustrated in FIG. 6.

Figure 8:
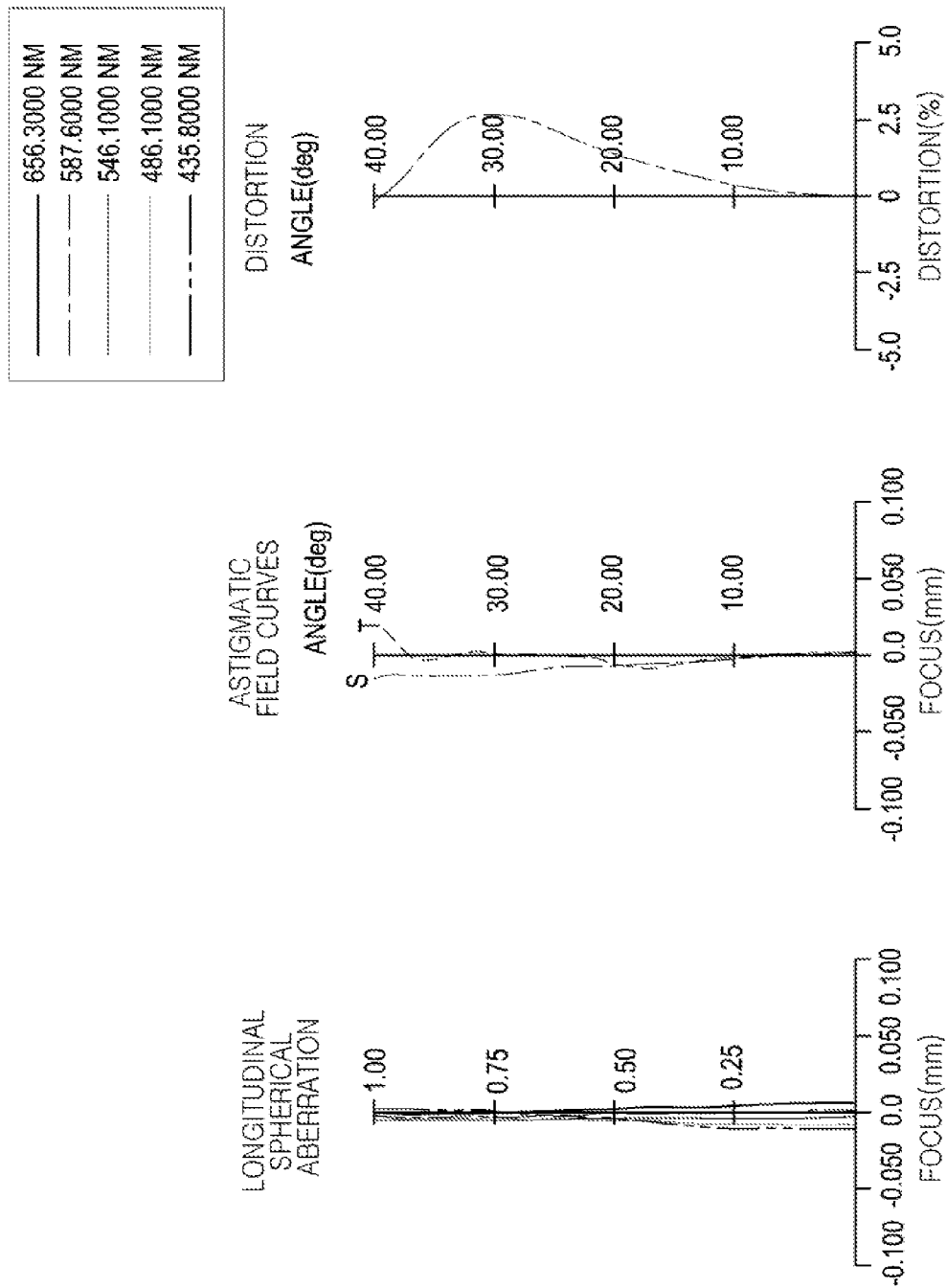
FIG. 8 is a graph including curves representing aberration characteristics of the lens module illustrated in FIG. 6.

FIG. 8 is a graph including curves representing aberration characteristics of the lens module illustrated in FIG. 6.

FIG. 9 is a table representing characteristics of the lenses of the lens module illustrated in FIG. 6. In FIG. 9, Surface Nos. 1 and 2 indicate the first surface (object-side surface) and the second surface (image-side surface) of the first lens, and Surface Nos. 3 and 4 indicate the first and second surfaces of the second lens. Similarly, Surface Nos. 5 to 12 indicate first and second surfaces of the third to sixth lenses, respectively. In addition, Surface Nos. 13 and 14 indicate first and second surfaces of the infrared cut-off filter.

FIG. 10 is a table representing aspherical surface coefficients of the lenses of the lens module illustrated in FIG. 6. In FIG. 10, the labels of the columns are Surface Nos. of the first to sixth lenses.

Figure 11:
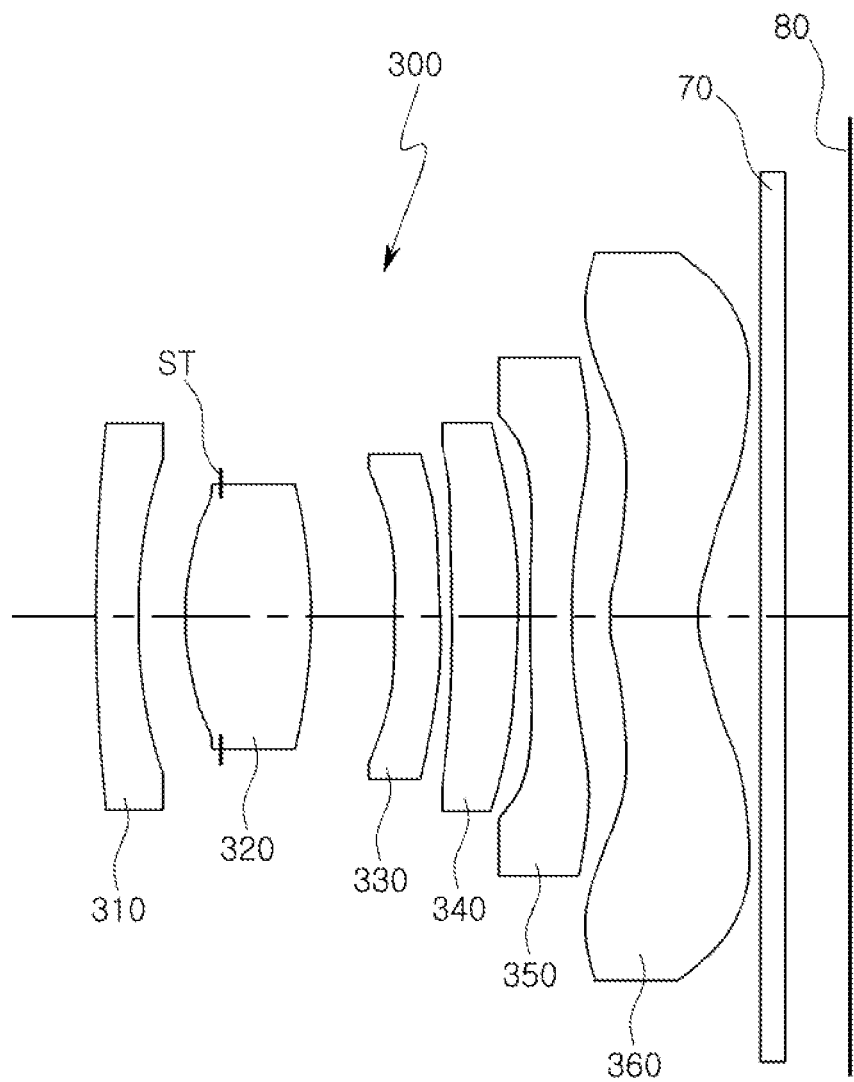
FIG. 11 is a view of a third example of a lens module.

FIG. 11 is a view of a third example of a lens module.

A lens module 300 includes an optical system including a first lens 310, a second lens 320, a third lens 330, a fourth lens 340, a fifth lens 350, and a sixth lens 360. In addition, the lens module 300 further includes an infrared cut-off filter 70 and an image sensor 80. Further, the lens module 300 further includes a stop (ST). In this example, the stop is disposed between the first lens 310 and the second lens 320.

In this example, the first lens 310 has negative refractive power, and an object-side surface thereof is convex and an image-side surface thereof is concave. The second lens 320 has positive refractive power, and an object-side surface thereof is convex and an image-side surface thereof is convex. The third lens 330 has positive refractive power, and an object-side surface thereof is concave and an image-side surface thereof is convex. The fourth lens 340 has negative refractive power, and an object-side surface thereof is concave and an image-side surface thereof is convex. The fifth lens 350 has positive refractive power, and an object-side surface thereof is convex and an image-side surface thereof is concave. In addition, one or more inflection points are formed on each of the object-side surface and the image-side surface of the fifth lens. The sixth lens 360 has negative refractive power, and an object-side surface thereof is convex and an image-side surface thereof is concave. In addition, one or more inflection points are formed on each of the object-side surface and the image-side surface of the sixth lens.

Figure 12:
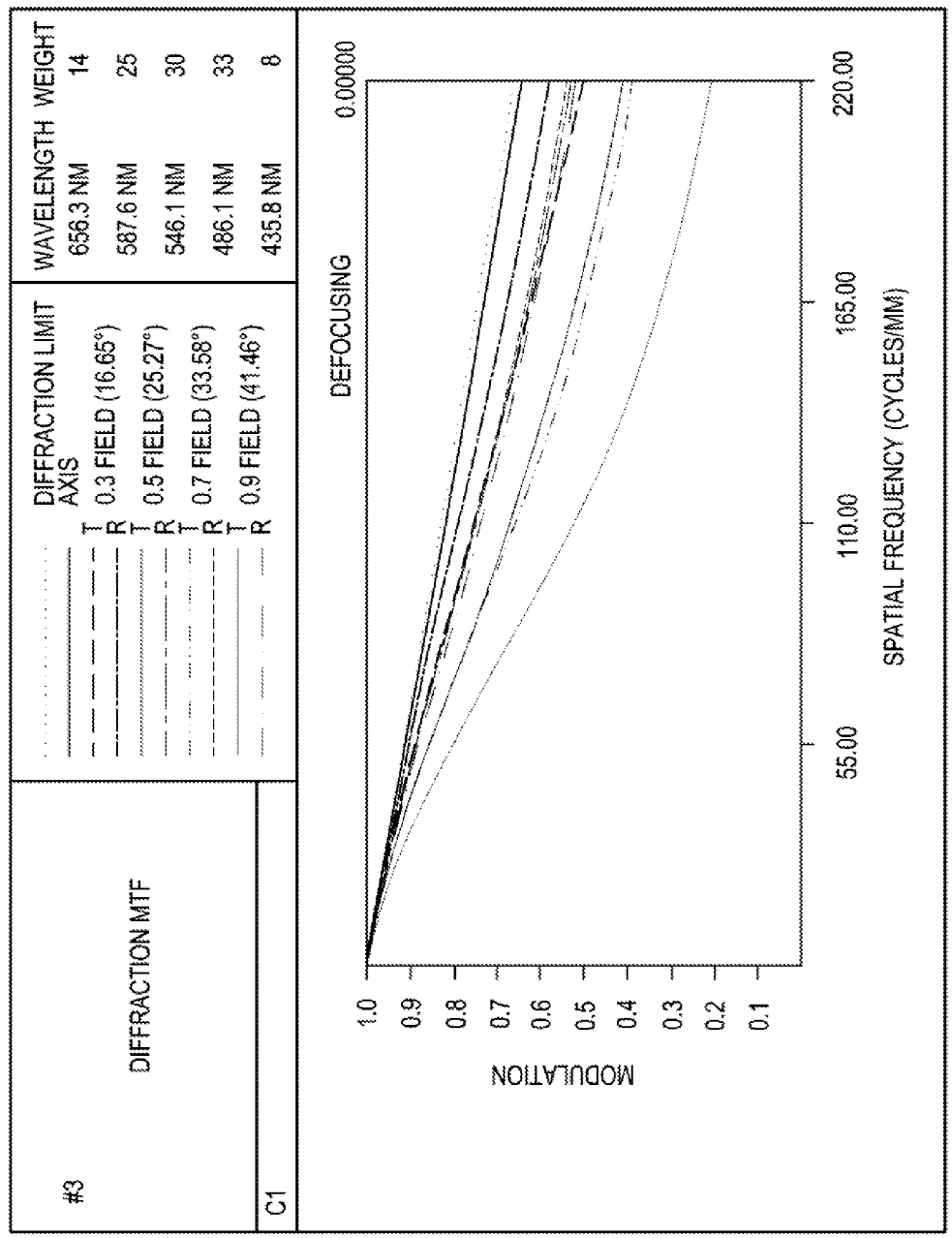
FIG. 12 is a graph including curves representing MTF characteristics of the lens module illustrated in FIG. 11.

FIG. 12 is a graph including curves representing MTF characteristics of the lens module illustrated in FIG. 11.

Figure 13:
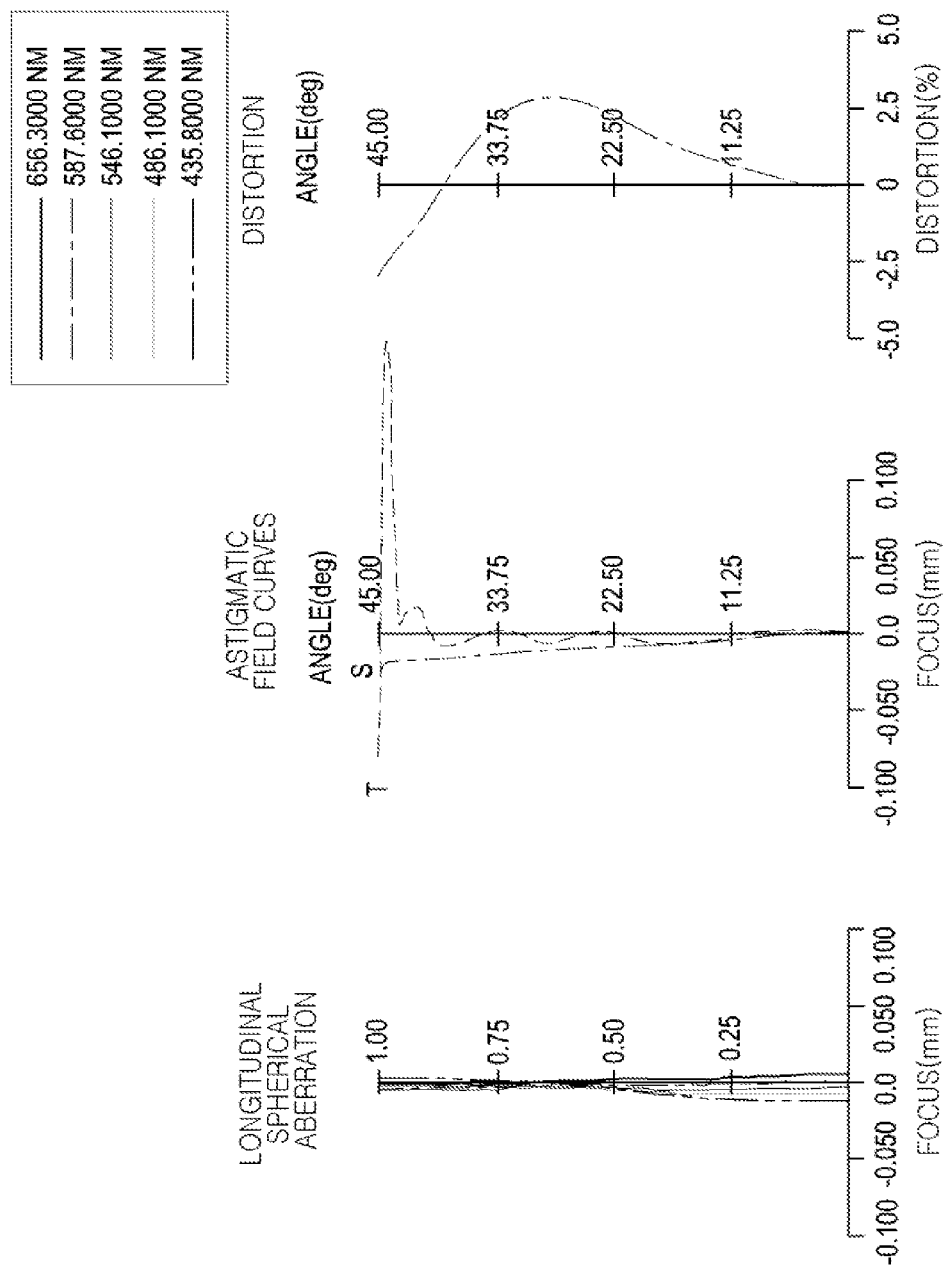
FIG. 13 is a graph including curves representing aberration characteristics of the lens module illustrated in FIG. 11.

FIG. 13 is a graph including curves representing aberration characteristics of the lens module illustrated in FIG. 11.

FIG. 14 is a table representing characteristics of the lenses of the lens module illustrated in FIG. 11. In FIG. 14, Surface Nos. 1 and 2 indicate the first surface (object-side surface) and the second surface (image-side surface) of the first lens, and Surface Nos. 3 and 4 indicate the first and second surfaces of the second lens. Similarly, Surface Nos. 5 to 12 indicate first and second surfaces of the third to sixth lenses, respectively. In addition, Surface Nos. 13 and 14 indicate first and second surfaces of the infrared cut-off filter.

FIG. 15 is a table representing aspherical surface coefficients of the lenses of the lens module illustrated in FIG. 11. In FIG. 15, the labels of the columns are Surface Nos. of the first to sixth lenses.

Figure 16:
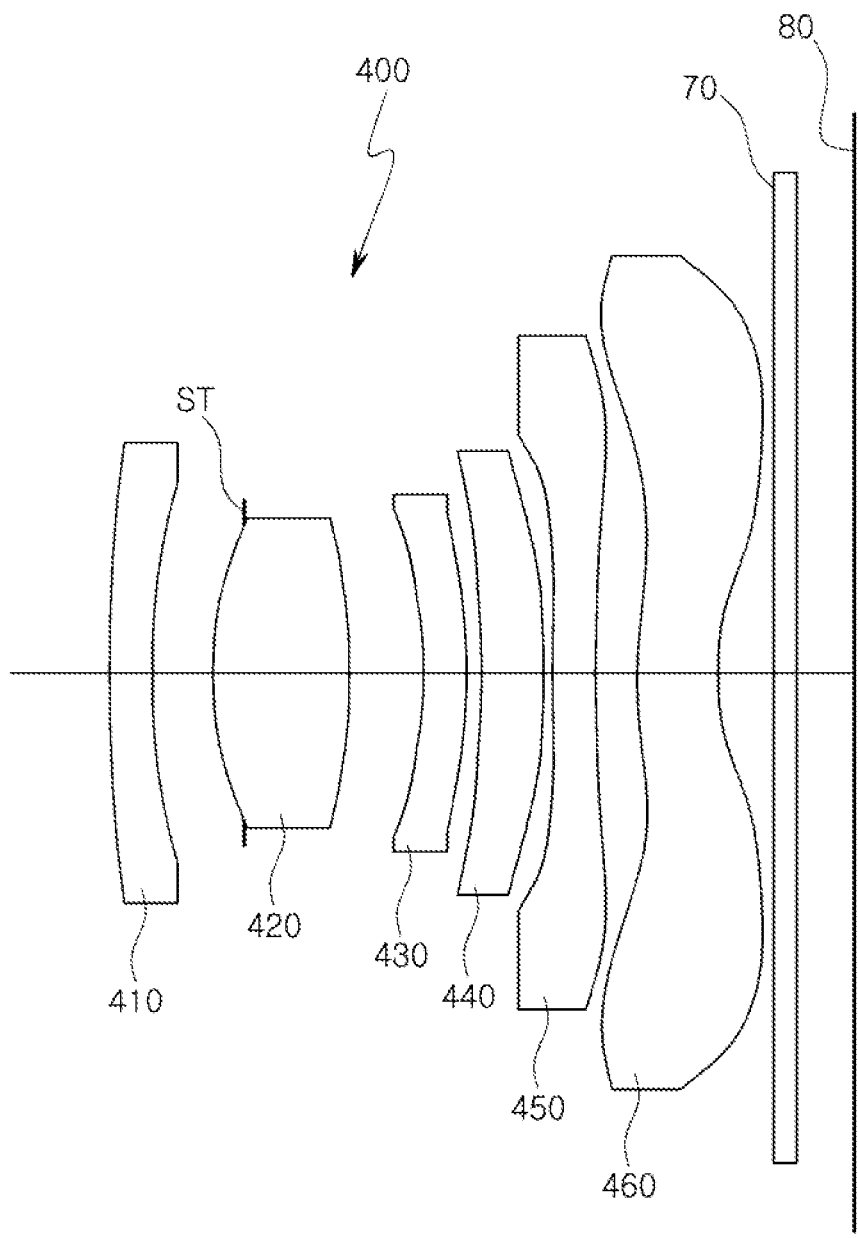
FIG. 16 is a view of a fourth example of a lens module.

FIG. 16 is a view of a fourth example of a lens module.

A lens module 400 includes an optical system including a first lens 410, a second lens 420, a third lens 430, a fourth lens 440, a fifth lens 450, and a sixth lens 460. In addition, the lens module 400 further includes an infrared cut-off filter 70 and an image sensor 80. Further, the lens module 400 further includes a stop (ST). In this example, example, the stop is disposed between the first lens 410 and the second lens 420.

In this example, the first lens 410 has negative refractive power, an object-side surface thereof is convex and an image-side surface thereof is concave. The second lens 420 has positive refractive power, and an object-side surface thereof is convex and an image-side surface thereof is convex. The third lens 430 has positive refractive power, and an object-side surface thereof is concave and an image-side surface thereof is convex. The fourth lens 440 has negative refractive power, and an object-side surface thereof is concave and an image-side surface thereof is convex. The fifth lens 450 has positive refractive power, and an object-side surface thereof is convex and an image-side surface thereof is concave. In addition, one or more inflection points are formed on each of the object-side surface and the image-side surface of the fifth lens. The sixth lens 460 has negative refractive power, and an object-side surface thereof is convex and an image-side surface thereof is concave. In addition, one or more inflection points are formed on each of the object-side surface and the image-side surface of the sixth lens.

Figure 17:
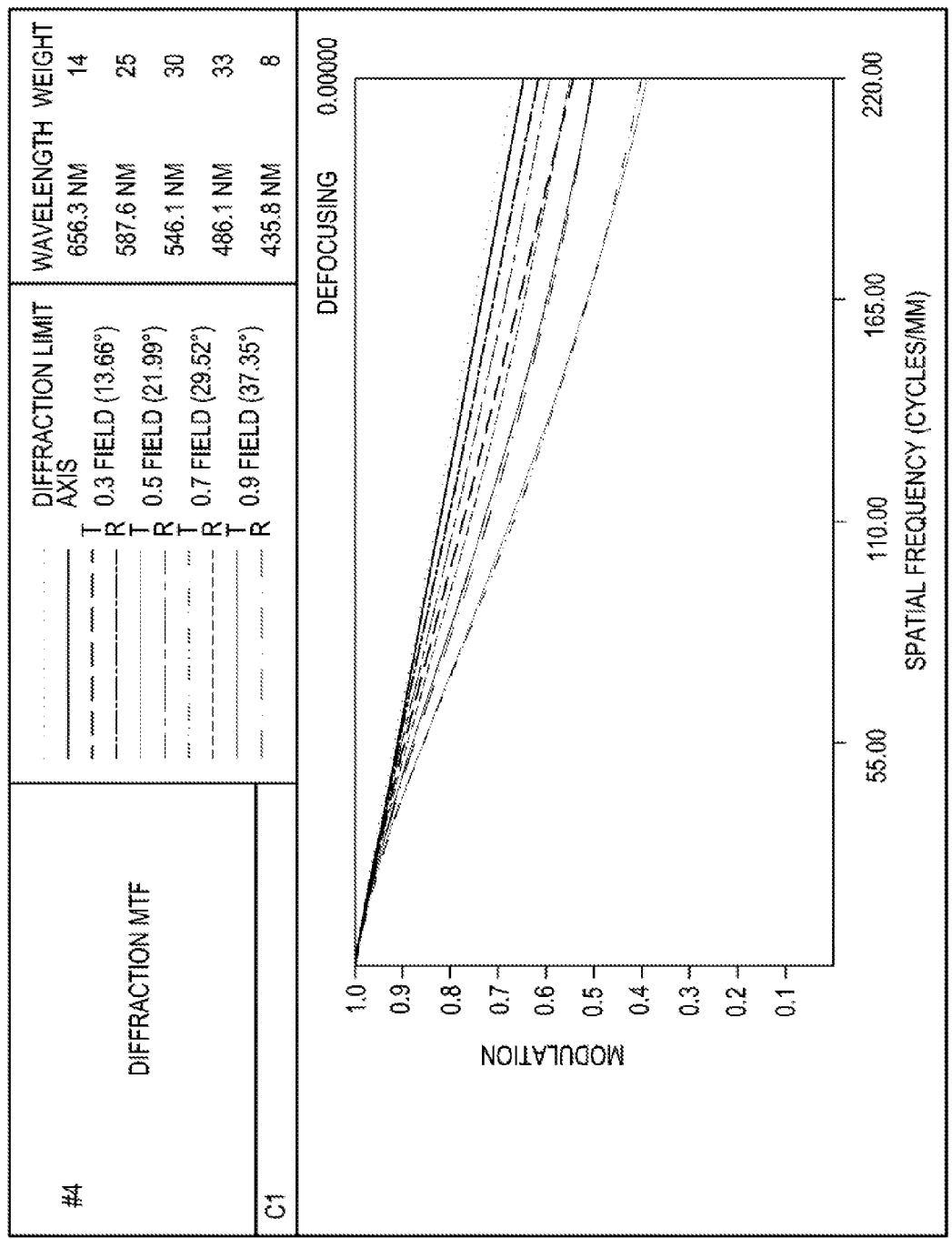
FIG. 17 is a graph including curves representing MTF characteristics of the lens module illustrated in FIG. 16.

FIG. 17 is a graph including curves representing MTF characteristics of the lens module illustrated in FIG. 16.

Figure 18:
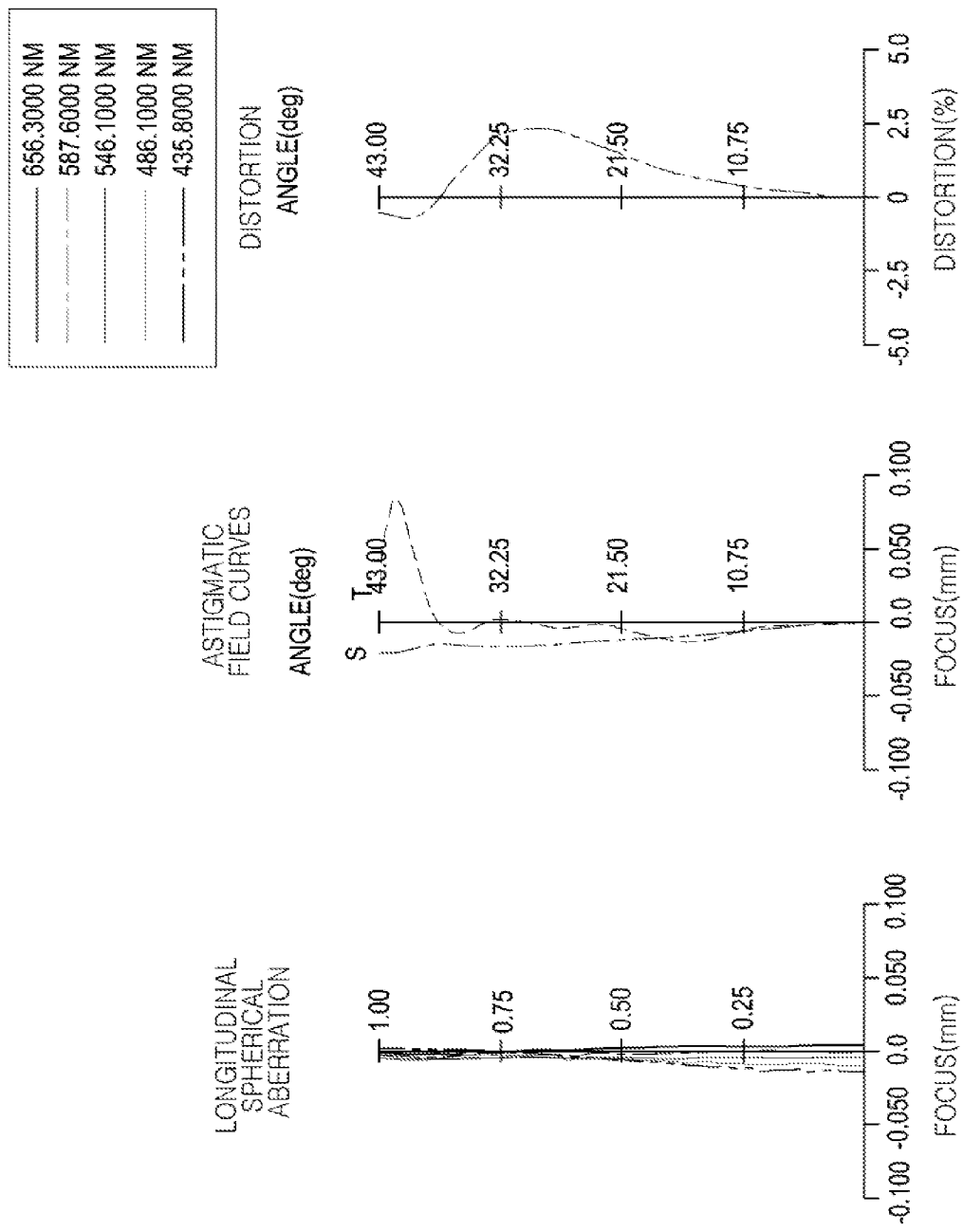
FIG. 18 is a graph including curves representing aberration characteristics of the lens module illustrated in FIG. 16.

FIG. 18 is a graph including curves representing aberration characteristics of the lens module illustrated in FIG. 16.

FIG. 19 is a table representing characteristics of the lenses of the lens module illustrated in FIG. 16. In FIG. 19, Surface Nos. 1 and 2 indicate the first surface (object-side surface) and the second surface (image-side surface) of the first lens, and Surface Nos. 3 and 4 indicate the first and second surfaces of the second lens. Similarly, Surface Nos. 5 to 12 indicate first and second surfaces of the third to sixth lenses, respectively. In addition, Surface Nos. 13 and 14 indicate first and second surfaces of the infrared cut-off filter.

FIG. 20 is a table representing aspherical surface coefficients of the lenses of the lens module illustrated in FIG. 16. In FIG. 20, 5, the labels of the columns are Surface Nos. of the first to sixth lenses.

The following Table 1 lists optical characteristics of the lens modules of the first to fourth examples. The lens module has an overall focal length (f) of 1.80 to 2.30. A focal length (f1) of the first lens is determined to be within a range of −11.0 to −7.0. A focal length (f2) of the second lens is determined to be within in a range of 1.70 to 2.00. A focal length (f3) of the third lens is determined to be 1000 or more. A focal length (f4) of the fourth lens is determined to be −8.0 or less. A focal length (f5) of the fifth lens is determined to be 1000 or more. A focal length (f6) of the sixth lens is determined to be within a range of −6.0 to −3.0.

TABLE 1

| Remarks | First Example | Second Example | Third Example | Fourth Example |
| --- | --- | --- | --- | --- |
| f | 2.741 | 2.750 | 2.380 | 2.483 |
| f1 | −10.232 | −8.177 | −7.643 | −7.765 |
| f2 | 1.881 | 1.948 | 1.823 | 1.782 |
| f3 | 1126.840 | 1064.789 | 1038.629 | 1065.478 |
| f4 | −9.105 | −988.171 | −999.575 | −987.834 |
| f5 | 1024.054 | 1022.729 | 1023.715 | 1024.744 |
| f6 | −5.275 | −4.195 | −5.074 | −3.727 |
| TTL | 4.054 | 3.873 | 3.508 | 3.648 |
| BFL | 0.686 | 0.693 | 0.700 | 0.677 |
| FOV | 80.000 | 80.000 | 90.000 | 86.000 |
| ANG | 40.000 | 40.000 | 45.000 | 43.000 |
| f12 | 2.231 | 2.260 | 2.040 | 1.850 |

The following Table 2 lists values of Conditional Expressions of the lens modules of the first to fourth examples.

TABLE 2

| Conditional Expressions | First Example | Second Example | Third Example | Fourth Example |
| --- | --- | --- | --- | --- |
| f12/f | 0.814 | 0.822 | 0.857 | 0.745 |
| TTL/D5 | 10.025 | 8.989 | 8.995 | 9.685 |
| BFL/f | 0.250 | 0.252 | 0.294 | 0.273 |
| r3/f | 0.466 | 0.456 | 0.530 | 0.468 |
| |V1 − V2| | 34.576 | 34.576 | 34.576 | 34.576 |
| (r9 − r10)/(r9 + r10) | −0.004 | 0.003 | 0.004 | 0.004 |
| (r1 − r2)/(r1 + r2) | −0.318 | 0.521 | 0.532 | 0.549 |
| SL/TTL | 0.846 | 0.850 | 0.834 | 0.820 |

As seen in Table 2, the lens modules of the first to fourth examples satisfy all of the Conditional Expressions.

The examples described above enable an optical system having a high resolution to be realized.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module comprising:
    a first lens, an object-side surface thereof being concave;
    a second lens, an object-side surface thereof being convex, and an image-side surface thereof being convex;
    a third lens, an object-side surface thereof being concave;
    a fourth lens having refractive power;
    a fifth lens having refractive power, an object-side surface thereof being concave; and
    a sixth lens having one or more inflection points on an image-side surface thereof;
    wherein the first to sixth lenses are sequentially disposed in numerical order from the first lens to the sixth lens starting at an object side of the lens module.

2. The lens module of claim 1, wherein an image-side surface of the first lens is convex.

3. The lens module of claim 1, wherein an image-side surface of the third lens is convex.

4. The lens module of claim 1, wherein an object-side surface of the fourth lens is concave, and an image-side surface of the fourth lens is convex.

5. The lens module of claim 1, wherein an image-side surface of the fifth lens is convex.

6. The lens module of claim 1, wherein an object-side surface of the sixth lens is convex, and the image-side surface of the sixth lens is concave.

7. A lens module comprising:
    a first lens having negative refractive power;
    a second lens, an object-side surface thereof being convex, and an image-side surface thereof being convex;
    a third lens, an object-side surface thereof being concave, and an image-side surface thereof being convex; concave;
    a fourth lens having refractive power;
    a fifth lens, an image-side surface thereof being concave; and
    a sixth lens having one or more inflection points on an image-side surface thereof;
    wherein the first to sixth lenses are sequentially disposed in numerical order from the first lens to the sixth lens starting at an object side of the lens module; and
    TTL/D23<11.0 is satisfied,
    where TTL is a distance from an object-side surface of the first lens to an image plane of the lens module, and
    D23 is a distance from the image-side surface of the second lens to the object-side surface of the third lens.

8. The lens module of claim 7, wherein the third lens has positive refractive power or the fourth lens has negative refractive power.

9. The lens module of claim 7, wherein the fifth lens has positive refractive power or the sixth lens has negative refractive power.

10. The lens module of claim 7, wherein 0.7<f12/f<0.9 is satisfied,
    where f12 is a composite focal length of the first and second lenses, and
    f is an overall focal length of an optical system comprising the first to sixth lenses.

11. The lens module of claim 7, wherein BFL/f<0.3 is satisfied,
    where BFL is a distance from the image-side surface of the sixth lens to the image plane, and f is an overall focal length of an optical system comprising the first to sixth lenses.

12. The lens module of claim 7, wherein $0.4 < r3/f$ is satisfied, where r3 is a radius of curvature of the object-side surface of the second lens, and f is an overall focal length of an optical system comprising the first to sixth lenses.

13. The lens module of claim 7, wherein $30 < |V1-V2| < 40$ is satisfied, where V1 is an Abbe number of the first lens, and V2 is an Abbe number of the second lens.

14. The lens module of claim 7, wherein $-0.1 < (r9-r10)/(r9+r10)$ is satisfied, where r9 is a radius of curvature of an object-side surface of the fifth lens, and r10 is a radius of curvature of the image-side surface of the fifth lens.

15. The lens module of claim 7, wherein $-0.4 < (r1-r2)/(r1+r2) < 0.6$ is satisfied, where r1 is a radius of curvature of the object-side surface of the first lens, and r2 is a radius of curvature of an image-side surface of the first lens.

16. The lens module of claim 7, wherein $SL/TTL < 0.85$ is satisfied, where SL is a distance from a stop to the image plane, and TTL is a distance from the object-side surface of the first lens to the image plane.

17. The lens module of claim 16, wherein the stop is disposed between the first lens and the second lens.

* * * * *